US012224478B2

(12) United States Patent
Severin et al.

(10) Patent No.: US 12,224,478 B2
(45) Date of Patent: Feb. 11, 2025

(54) OFFSET EXTENSION UNITS FOR ANTENNA MOUNTS AND RELATED ASSEMBLIES

(71) Applicant: Outdoor Wireless Networks LLC, Claremont, NC (US)

(72) Inventors: Matthew Severin, Gravevine, TX (US); Dale Heath, Fort Worth, TX (US); Brian Cross, Double Oak, TX (US)

(73) Assignee: Outdoor Wireless Networks LLC, Claremont, NC (US)

( * ) Notice: Subject to any disclaimer, the term of this patent is extended or adjusted under 35 U.S.C. 154(b) by 169 days.

(21) Appl. No.: 18/059,614

(22) Filed: Nov. 29, 2022

(65) Prior Publication Data

US 2023/0178873 A1 Jun. 8, 2023

Related U.S. Application Data

(60) Provisional application No. 63/286,850, filed on Dec. 7, 2021.

(51) Int. Cl.
*H01Q 1/12* (2006.01)

(52) U.S. Cl.
CPC ............. *H01Q 1/1228* (2013.01); *H01Q 1/12* (2013.01)

(58) Field of Classification Search
CPC ................................ H01Q 1/1228; H01Q 1/12
See application file for complete search history.

(56) References Cited

U.S. PATENT DOCUMENTS

| | | | | |
|---|---|---|---|---|
| 7,113,145 | B1 * | 9/2006 | Noble | H01Q 1/1228 343/890 |
| 7,466,286 | B2 * | 12/2008 | Chapman | H01Q 1/1235 52/645 |
| 9,812,762 | B2 | 11/2017 | Skrepcinski et al. | |
| 9,853,346 | B2 | 12/2017 | Skrepcinski et al. | |
| 10,122,064 | B2 | 11/2018 | Skrepcinski et al. | |
| 2006/0087476 | A1 * | 4/2006 | Piburn | H01Q 1/246 343/890 |
| 2007/0261355 | A1 * | 11/2007 | Carlisle | H01Q 1/1242 52/633 |
| 2011/0148116 | A1 * | 6/2011 | Halstead | F03D 3/005 290/55 |
| 2013/0233983 | A1 * | 9/2013 | Adams | H01Q 1/12 248/158 |

* cited by examiner

*Primary Examiner* — Hai V Tran
(74) *Attorney, Agent, or Firm* — Myers Bigel, P.A.

(57) ABSTRACT

The present disclosure describes a sector frame antenna mount assembly. The assembly includes an antenna mount, a sector frame, and a pair of offset extension units. The pair of offset extension units are configured to position the sector frame an increased distance from a mounting structure.

19 Claims, 7 Drawing Sheets

OFFSET EXTENSION UNITS FOR ANTENNA MOUNTS AND RELATED ASSEMBLIES

RELATED APPLICATION(S)

The present application claims priority from and the benefit of U.S. Provisional patent application Ser. No. 63/286,850, filed Dec. 7, 2021, the disclosure of which is hereby incorporated herein in its entirety.

FIELD

The present invention relates generally to telecommunications equipment, and more particularly, antenna mounts and related assemblies.

BACKGROUND

With increased demand for more wireless communication, the number of radio and antenna units that a tower traditionally supports has increased and is expected to continue to increase. New towers will need to be designed to support greater numbers of antenna and radio units, while existing towers are retrofitted to support more units, and effort is made to fully utilize space available on the towers.

In addition, antennas are becoming larger in order to handle more wireless traffic. One parameter that influences antenna design is Effective Projected Area (EPA), which is determined by calculations defined by TIA/ANSI-222-G. EPA is intended to predict the effect of wind loading on an antenna structure to enable designers to create a safe design. The configuration of the antenna mount can impact the calculations. As such, minimizing an antenna mount's contribution to EPA can be desirable.

Further, the use of metal components near an antenna on cell sites can be a source of unwanted passive intermodulation (PIM) in the modern radio frequency (RF) environment. As antenna systems have become more complex in the last few years along with the densification of cell towers, interaction of external noise has become a PIM source that impacts the network performance.

Currently, to address some of the above challenges, antenna mounts have been designed to offset antennas away from a mounting structure, such as, the leg of an antenna tower. An exemplary sector frame antenna mount assembly, designated broadly at 10, is illustrated in FIG. 1. The sector frame antenna mount assembly 10 includes a sector frame 20 for antenna mounting and an offset mount 30. The sector frame 20 includes horizontal members 22 and vertical members 24 which allow the mounting of antennas (not shown) thereon. The offset mount 30 is configured to be secured to the horizontal members 22 of the sector frame 20 (e.g., via U-bolts or other fasteners) and may be used to position and secure the sector frame 20 (and antennas mounted thereon) a distance (D) from the mounting structure 50 (see, e.g., FIG. 2). The offset mount 30 includes two arms 32 having upper and lower segments. The arms 32 are positioned at a non-zero angle relative to each other (e.g., approximately 120 degrees apart). In some offset mounts 30, the arms 32 may be secured to a vertical post 35. The offset mount 30 further includes two pipe clamps 31 configured to clamp the offset mount 30 to a leg of an antenna tower or other mounting structure 50. See, e.g., U.S. Pat. No. 9,812,762 to Skrepcinski et al.; U.S. Pat. No. 9,853,346 to Skrepcinski et al.; and U.S. Pat. No. 10,122,064 to Skrepcinski et al., the disclosures of which are hereby incorporated herein in full.

As shown in FIG. 2, when secured to some mounting structures, for example, on smaller towers such as guyed towers, the ends of adjacent sector frames 20 may be in close contact, see, e.g., designated area "A", which can physically interfere with each other. The close proximity of adjacent ends of the sector frames 20 can create unwanted PIM interference (e.g., by the ends of the sector frames 20 rubbing together). In addition, when antennas 150 are positioned at adjacent ends of the sector frames 20, the close proximity of the antennas 150 can create unwanted signal interference between the antennas 150. For example, some antennas 150 require 2-3 feet of separation to avoid interference, whereas other antennas 150 may require up to 6 feet of separation. Moreover, the overall size of the sector frames 20 may prohibit multiple sector frames 20 from fitting on the same (smaller) mounting structure.

In some instances, it may be desired to offset the sector frame a further distance from the mounting structure.

SUMMARY

A first aspect of the present invention is directed to a sector frame antenna mount assembly. The assembly includes an antenna mount, a sector frame, and a pair of offset extension units. The antenna mount includes first and second arms, each arm having upper and lower segments, the arms positioned at a non-zero angle relative to each other; and a pipe clamp configured to secure the antenna mount to a mounting structure. The sector frame includes a plurality of horizontal and vertical members, the vertical members are configured such that one or more antennas can be mounted thereto. Each offset extension unit includes two horizontal runs positioned parallel to each other, the horizontal runs being secured to each other via a plurality of support rods; a first set of mounting plates secured to a first end of each horizontal run, wherein the first set of mounting plates are further secured to the upper and lower segments of a respective arm of the antenna mount; and a second set of mounting plates secured to a second end of each horizontal run, wherein the second set of mounting plates are further secured to a respective horizontal or vertical member of the sector frame.

Another aspect of the present invention is directed to a sector frame antenna mount assembly. The assembly includes a mounting structure, an antenna mount, sector frame, and a pair of offset extension units. The antenna mount includes first and second arms, each arm having upper and lower segments, the arms positioned at a non-zero angle relative to each other; and a pipe clamp configured such that the antenna mount is secured to the mounting structure. The sector frame includes a plurality of horizontal and vertical members, the vertical members are configured such that one or more antennas can be mounted thereto. Each offset extension unit includes two horizontal runs positioned parallel to each other, the horizontal runs being secured to each other via a plurality of support rods; a first set of mounting plates secured to a first end of each horizontal run, wherein the first set of mounting plates are further secured to the upper and lower segments of a respective arm of the antenna mount; and a second set of mounting plates secured to a second end of each horizontal run, wherein the second set of mounting plates are further secured to a respective horizontal or vertical member of the sector frame. The pair of offset extension units position the sector frame an increased distance from the mounting structure.

Another aspect of the present invention is directed to an offset extension mount kit. The kit includes an antenna mount and a pair of offset extension units. The antenna mount includes first and second arms, each arm having upper and lower segments; and a pipe clamp configured to secure the antenna mount to a mounting structure. Each offset extension unit includes two horizontal runs positioned parallel to each other, the horizontal runs being secured to each other via a plurality of support rods; a first set of mounting plates secured to a first end of each horizontal run and pivotably secured to the upper and lower segments of a respective arm of the antenna mount; and a second set of mounting plates secured to a second end of each horizontal run.

Another aspect of the present invention is directed to a pair of offset extension units for a sector frame antenna mount assembly. Each extension unit includes two horizontal runs positioned parallel to each other, the horizontal runs being secured to each other via a plurality of support rods; a first set of mounting plates secured to a first end of each horizontal run; and a second set of mounting plates secured to a second end of each horizontal run. The first set of mounting plates are configured to be secured to an antenna mount and the second set of mounting plates are configured to be secured to a sector frame.

Another aspect of the present invention is directed to a sector frame antenna mount assembly. The assembly includes a mounting structure, three antenna mounts, three sector frames, and three pairs of offset extension units. Each antenna mount includes first and second arms, each arm having upper and lower segments, the arms positioned at a non-zero angle relative to each other; and a pipe clamp configured such that the antenna mount is secured to the mounting structure. Each sector frame includes a plurality of horizontal and vertical members, the vertical members configured such that one or more antennas can be mounted thereto. Each offset extension unit includes two horizontal runs positioned parallel to each other, the horizontal runs being secured to each other via a plurality of support rods; a first set of mounting plates secured to a first end of each horizontal run, wherein the first set of mounting plates are further secured to the upper and lower segments of a respective arm of the antenna mount; and a second set of mounting plates secured to a second end of each horizontal run, wherein the second set of mounting plates are further secured to a respective horizontal or vertical member of the sector frame. Each pair of offset extension units position a respective sector frame an increased distance from the mounting structure.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
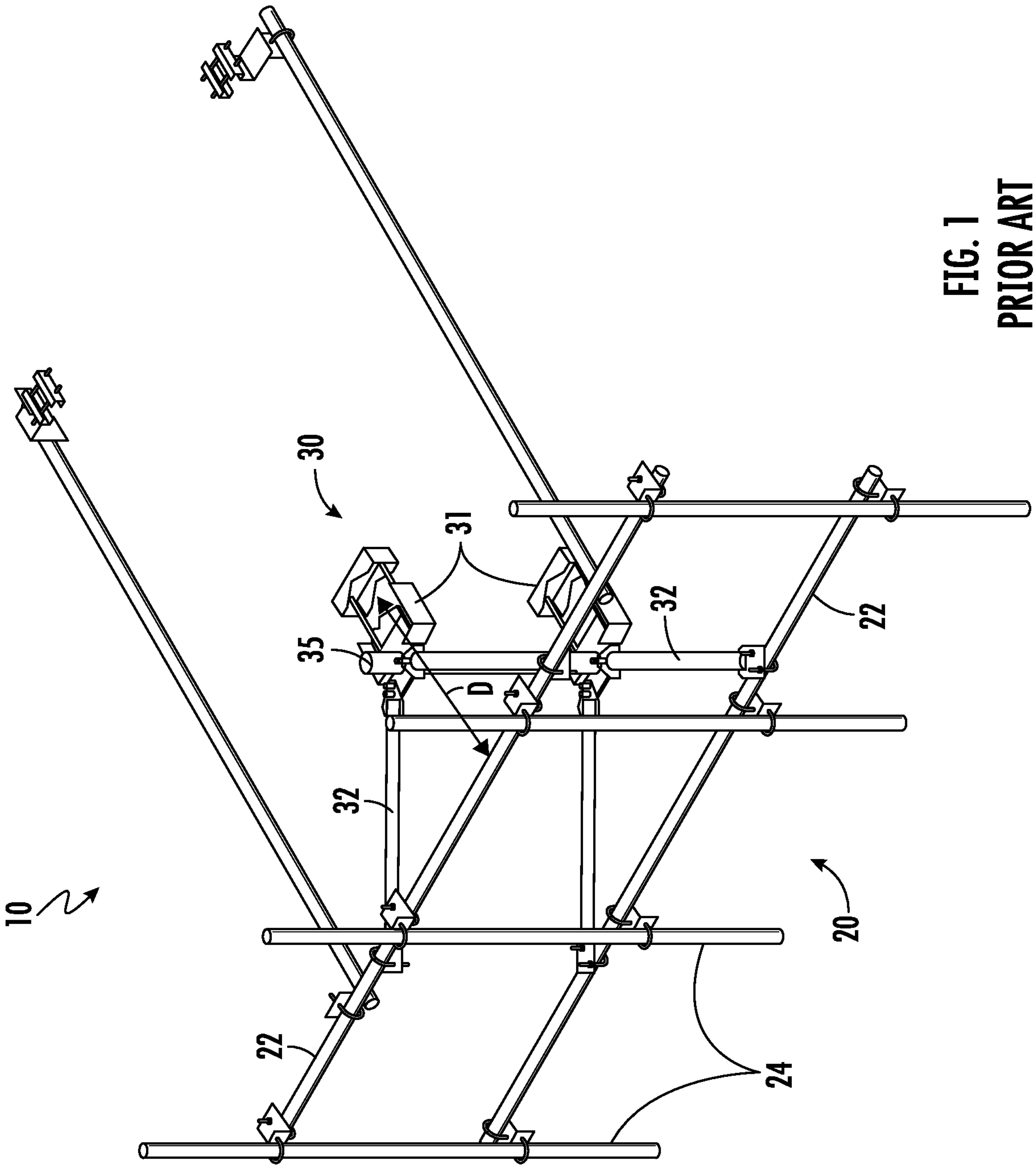
FIG. 1 PRIOR ART
FIG. 1 is a perspective view of a known sector frame antenna mount assembly.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. In some cases, two-part reference numerals are used in the drawings.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Pursuant to embodiments of the present invention, an offset extension kit is provided that may be used with existing offset antenna mounts to increase the distance a sector frame may be secured from a mounting structure without having to replace the existing antenna mount assembly. In addition, the offset extension kit of the present invention may be used to increase the distance of separation between antennas mounted on adjacent sector frames secured to the same mounting structure. Embodiments of the present invention will now be discussed in greater detail with reference to FIGS. 3-7.

Figure 2:
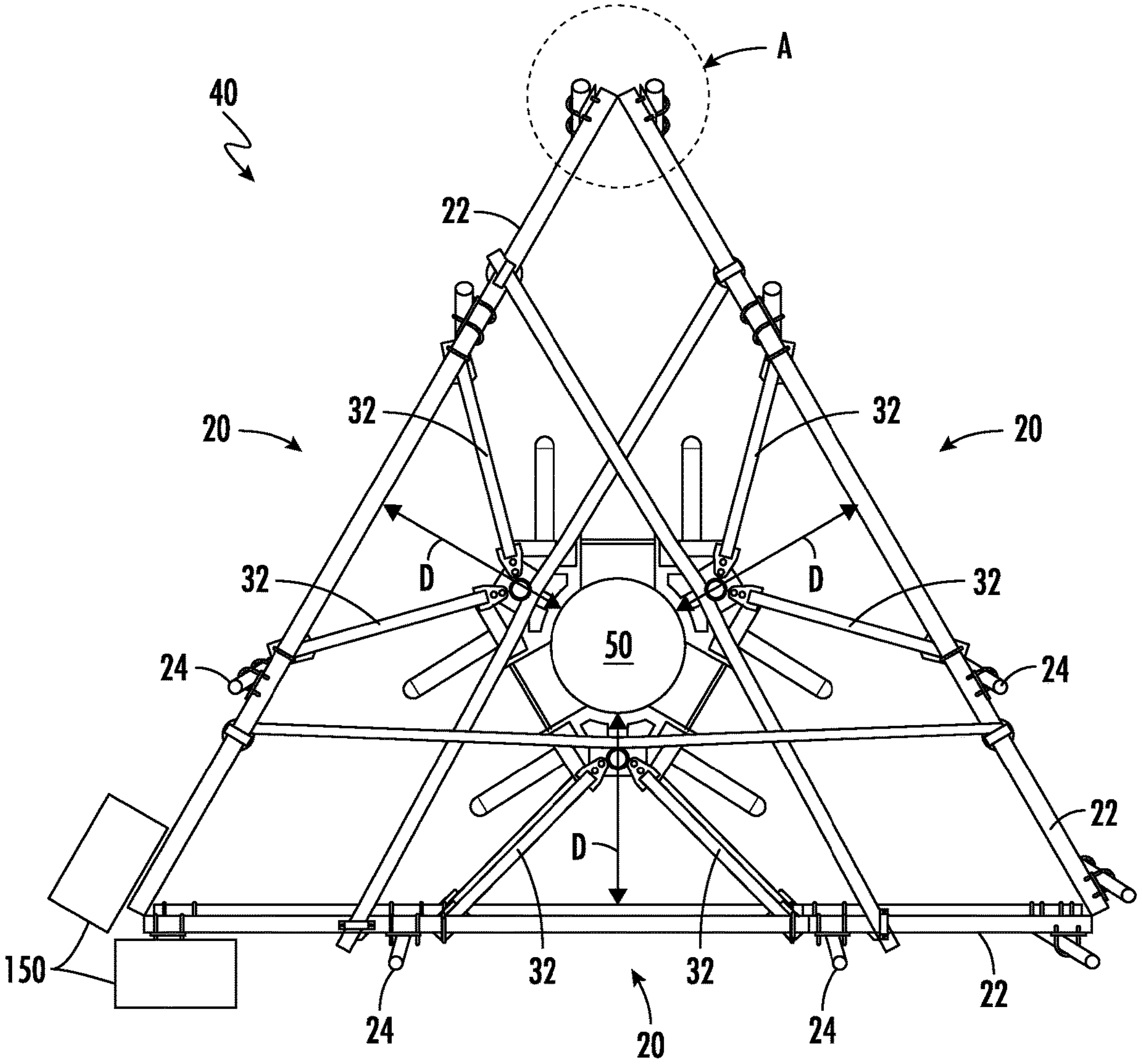
FIG. 2 PRIOR ART
FIG. 2 is a top view of three assemblies of FIG. 1 secured on a mounting structure.
Figure 3:
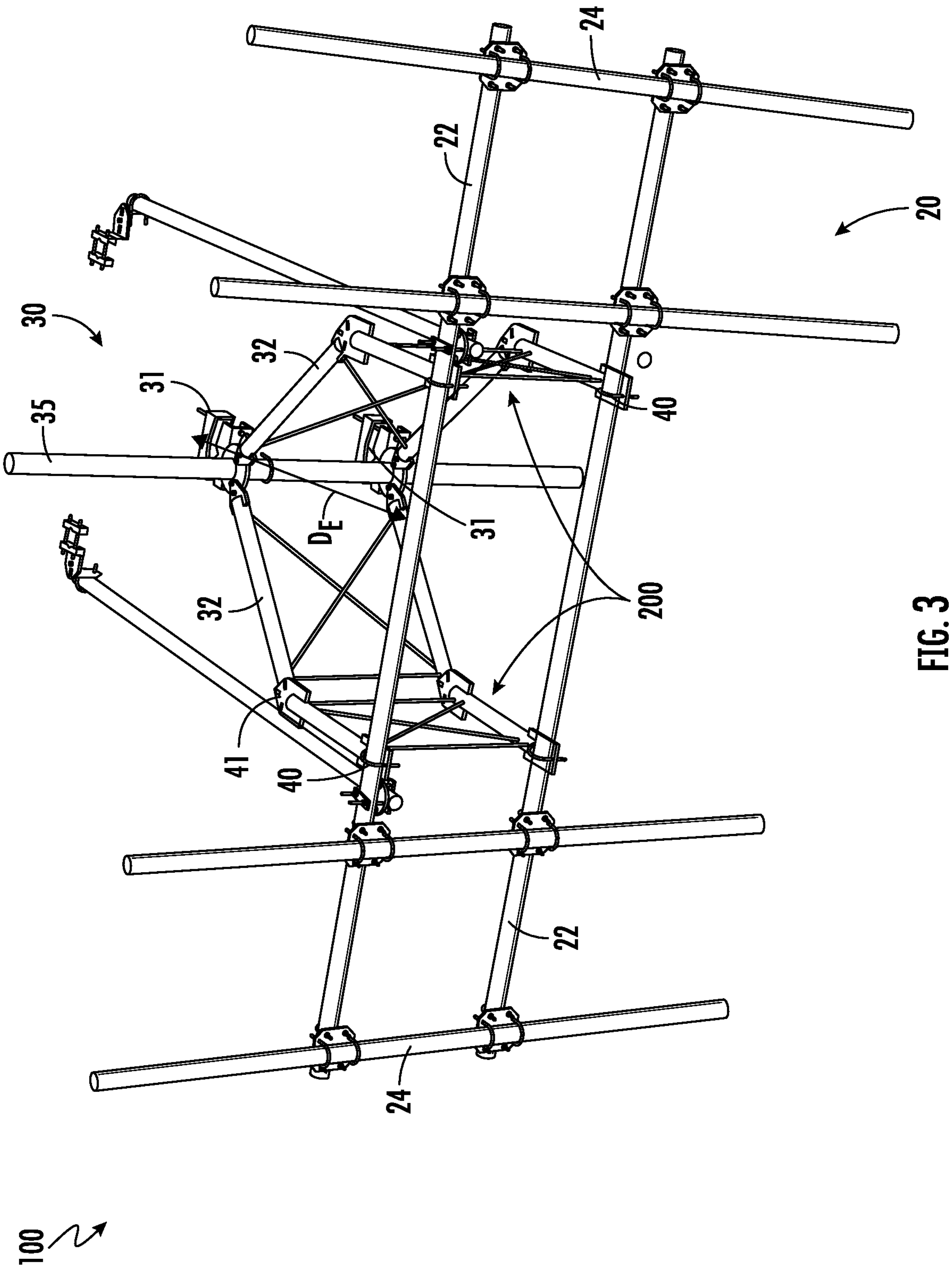
FIG. 3 is a perspective view of an exemplary antenna sector frame assembly according to embodiments of the present invention.

Referring now to the figures, a sector frame antenna mount assembly according to embodiments of the present invention, designated broadly at 100, is illustrated in FIG. 3. As shown in FIG. 3, the assembly 100 is similar to the assembly 10 described above, except the assembly 100 of the present invention includes a pair of offset extension units 200 which increase the distance ($D_E$) that the sector frame 20 is positioned from a mounting structure. In some embodiments, the offset extension units 200 of the present invention allow the sector frame 20 to be secured a distance ($D_E$) of about 60 inches from the mounting structure. Some current offset mounts (e.g., offset mount 30 illustrated in FIGS. 1 and 2) provide for an offset distance (D) of about 42 inches. Thus, in some embodiments, the offset extension units 200 of the present invention may allow for the sector frame 20 (and antennas mounted thereon) to be positioned an additional distance of about 18 inches from the respective mounting structure (i.e., the length (L) of each offset extension unit 200 is about 18 inches). In some embodiments, the mounting structure is a leg of an antenna tower or a monopole. As discussed in further detail below, the offset extension units 200 are configured to be securable to existing offset mounts 30, thereby allowing for the increased distance ($D_E$) without having to replace an entire existing antenna mount assembly, and thus, reducing costs. In addition, the increased distance ($D_E$) may allow for reduced PIM within the near antenna environment. Furthermore, the offset extension units 200 project the face of the sector frames 20 further from the mounting structure 50 to allow for an increased distance of separation ($D_S$) between adjacent ends of the sector frames 20 (and/or antennas 150 positioned at adjacent ends of the sector frames 20), for example, on smaller tower such as guyed towers (e.g., compare assemblies shown in FIG. 2 and FIG. 5).

Figure 4:
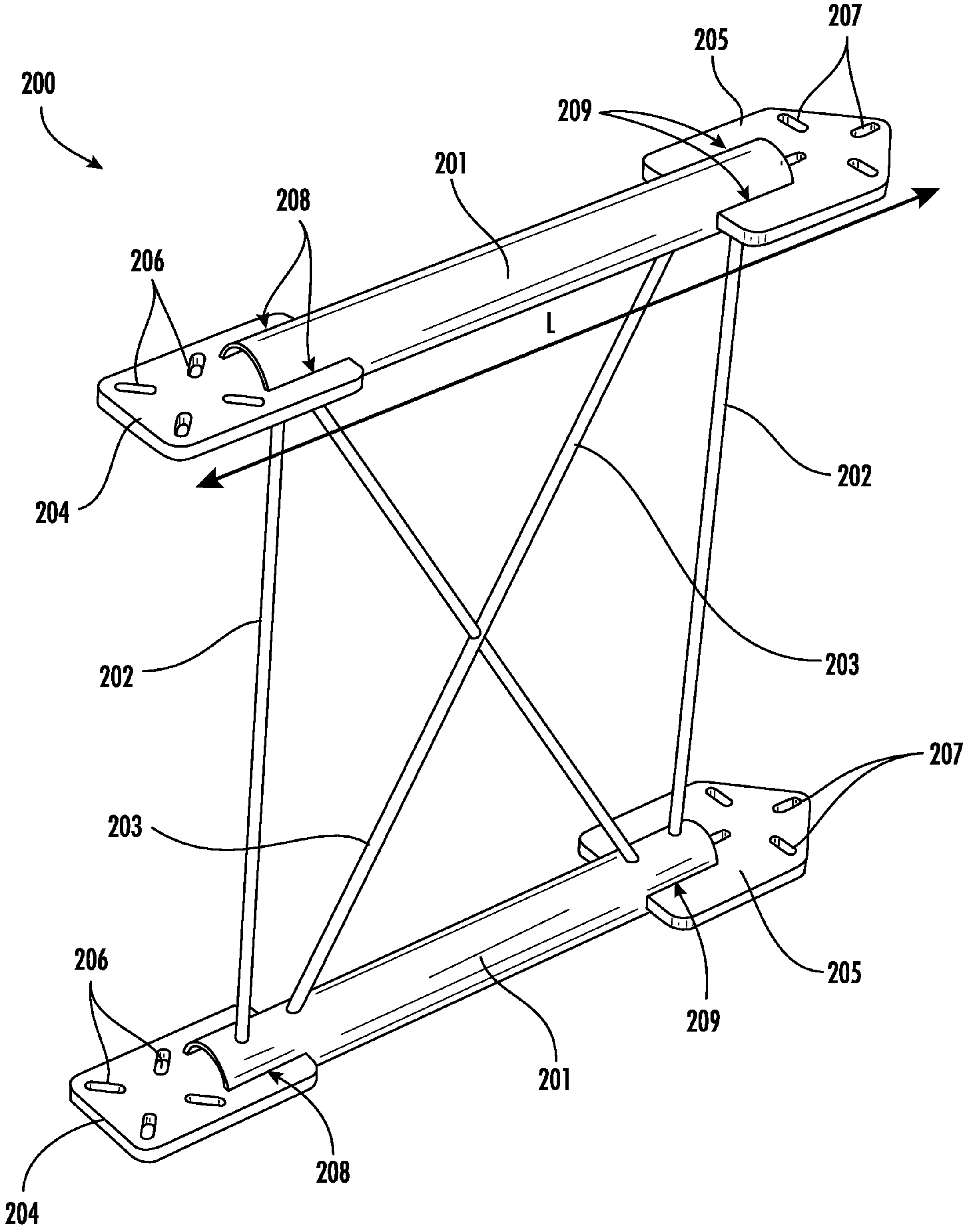
FIG. 4 is a perspective view of an offset extension unit according to embodiments of the present invention.

Referring now to FIG. 4, one of the offset extension units 200 of the present invention is illustrated. The offset extension units 200 within the assembly 100 may be identical as shown herein. As shown in FIG. 4, in some embodiments, each offset extension unit 200 includes two horizontal runs 201 positioned parallel to each other. As used herein, the terms "horizontal" and "vertical" refer to the orientation with respect to a ground surface (i.e., surface of the Earth). In some embodiments, each horizontal run 201 may have a tubular shape. It is noted that while shown as a cylindrical tubular shape in the figures, in other embodiments, each horizontal run 201 may have another cross-sectional shape, for example, square or rectangular, and may be hollow or solid.

The horizontal runs 201 are secured to each other via a plurality of support rods 202, 203 which adds structural support to the extension units 200 as well as the sector frame antenna mount assembly 100. In some embodiments, each offset extension unit 200 may comprise two vertical support rods 202 and two cross-support rods 203 to form a skeletal frame or scaffold.

At one end of each horizontal run 201 is a mounting plate 204. In some embodiments, the mounting plate 204 has a rectangular shape. The mounting plate 204 has a plurality of mounting apertures 206. The mounting apertures 206 are configured to receive a fastener 40 (e.g., a U-bolt) such that the offset extension units 200 may be secured to a respective horizontal member 22 or vertical member 24 of the sector frame 20 (see, e.g., FIG. 3). In some embodiments, the mounting plate 204 further includes a pair of slots 208. The slots 208 of the mounting plate 204 are sized and configured to receive the end of the tubular horizontal run 201, which then can be secured to the mounting plate 204 (e.g., via welding).

At the other end of each horizontal run 201 is another mounting plate 205. In some embodiments, the mounting plate 204 has a polygonal shape (in this instance, a pentagonal shape). The mounting plate 205 has a plurality of mounting apertures 207. The mounting apertures 207 are configured to receive a fastener 41 (e.g., a bolt or other threaded or unthreaded fastener) such that each offset extension unit 200 may be secured to a respective arm 32 of the existing offset mount 30 (see, e.g., FIG. 3). Similar to the opposing mounting plate 204, in some embodiments, the mounting plate 205 further includes a pair of slots 209 that are sized and configured to receive the other end of the tubular horizontal run 201, which then can be secured to the mounting plate 205 (e.g., via welding).

Another advantage that can be provided by the offset extension units 200 of the present invention is related to packaging and shipping. Each of the mounting plates 205 may be attached to a respective arm 32 of the offset mount 30 with only one fastener 41. As such, the extension units 200 can be pivoted relative to the arms 32 to a retracted position in which they are substantially parallel with each other, thereby forming a substantially level structure. Similar methods are described in U.S. Pat. Nos. 9,812,762 and 10,122,064.

Figure 5:
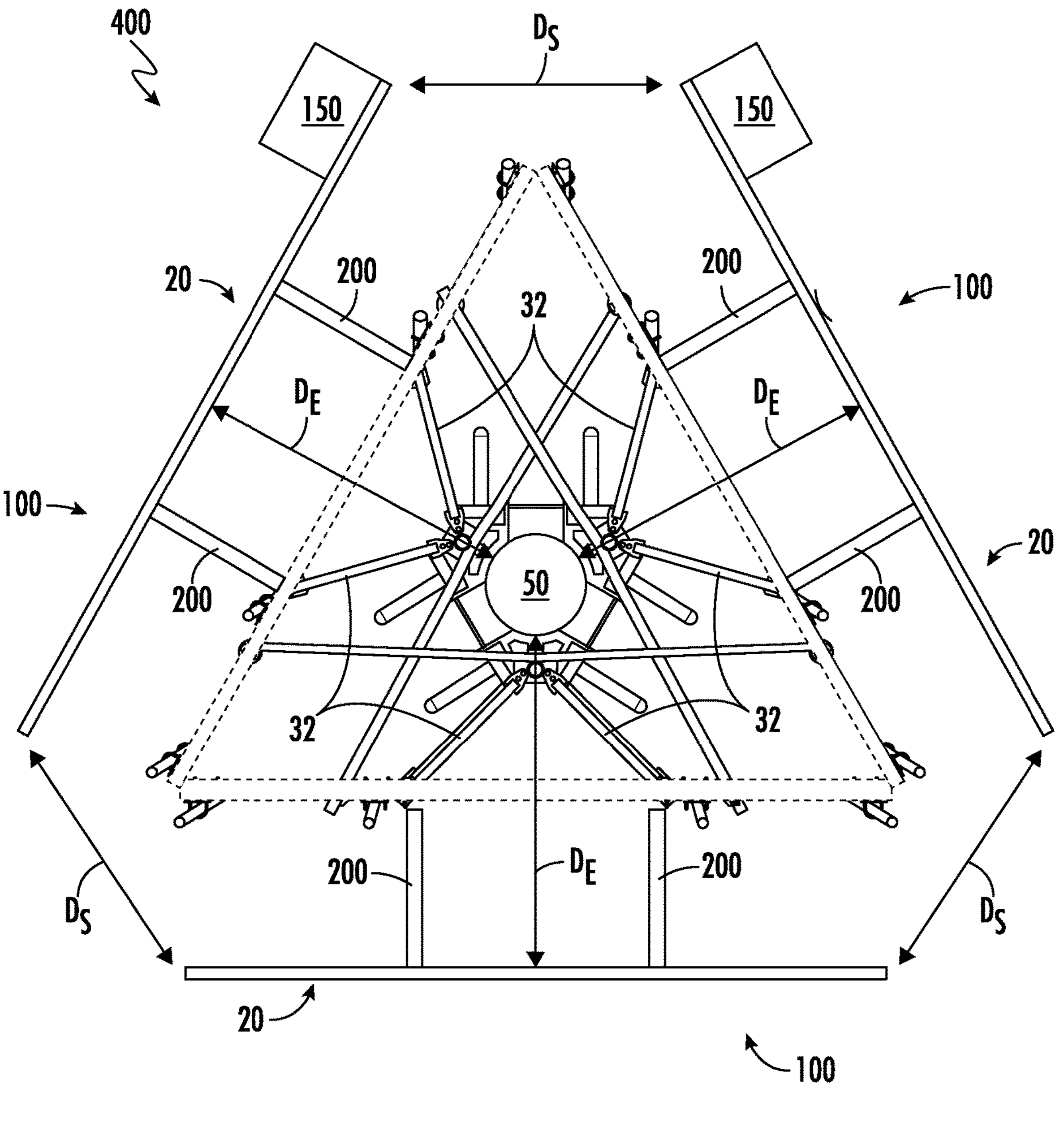
FIG. 5 is a top view of three assemblies of FIG. 3 secured on a mounting structure according to embodiments of the present invention.

FIG. 5 illustrates three assemblies 100 secured on a mounting structure 50. As shown in FIG. 5, the offset extension units 200 of each assembly 100 of the present invention project the face of each sector frame 20 an increased distance ($D_E$) from the mounting structure 50 (e.g., compared with known assemblies as shown in FIG. 2). The offset extension units 200 of the present invention may also allow for an increased distance of separation ($D_S$) between adjacent ends of the sector frames 20, thereby helping to reduce unwanted PIM interference (e.g., by preventing the ends of the sector frames 20 rubbing together). In addition, when antennas 150 are positioned at adjacent ends of the sector frames 20, the offset extension units 200 may also allow for an increased distance of separation ($D_S$) between adjacent antennas 150, thereby helping to reduce unwanted signal interference between the antennas 150, especially on smaller towers such as guyed towers. In some embodiments, the distance of separation ($D_S$) between the adjacent ends of the sector frames 20 and/or antennas 150 positioned at adjacent ends of adjacent sector frames 20 is in a range of from about 2 feet to about 6 feet.

Figure 6:
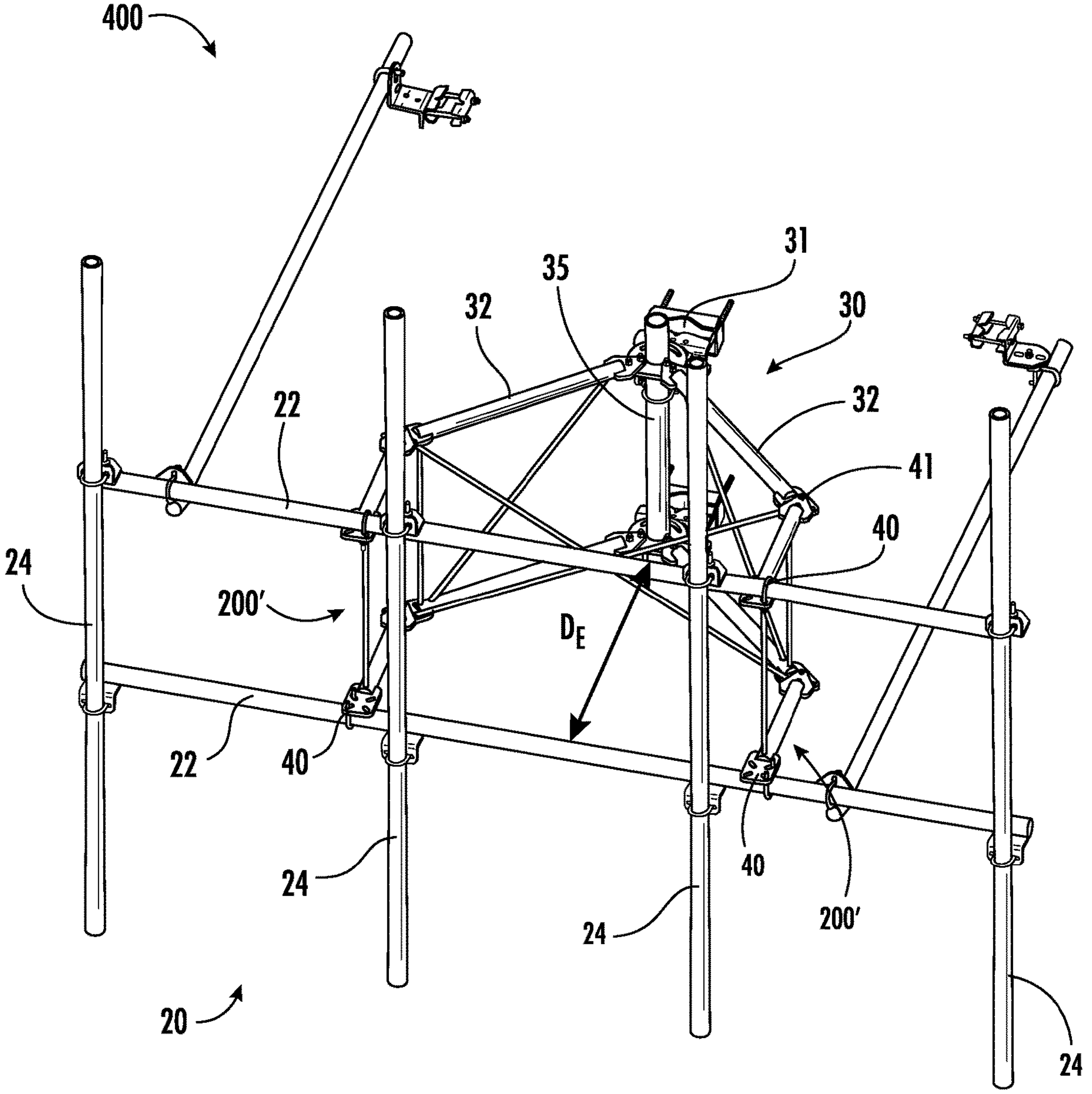
FIG. 6 is a perspective view of another exemplary antenna sector frame assembly according to embodiments of the present invention.
Figure 7:
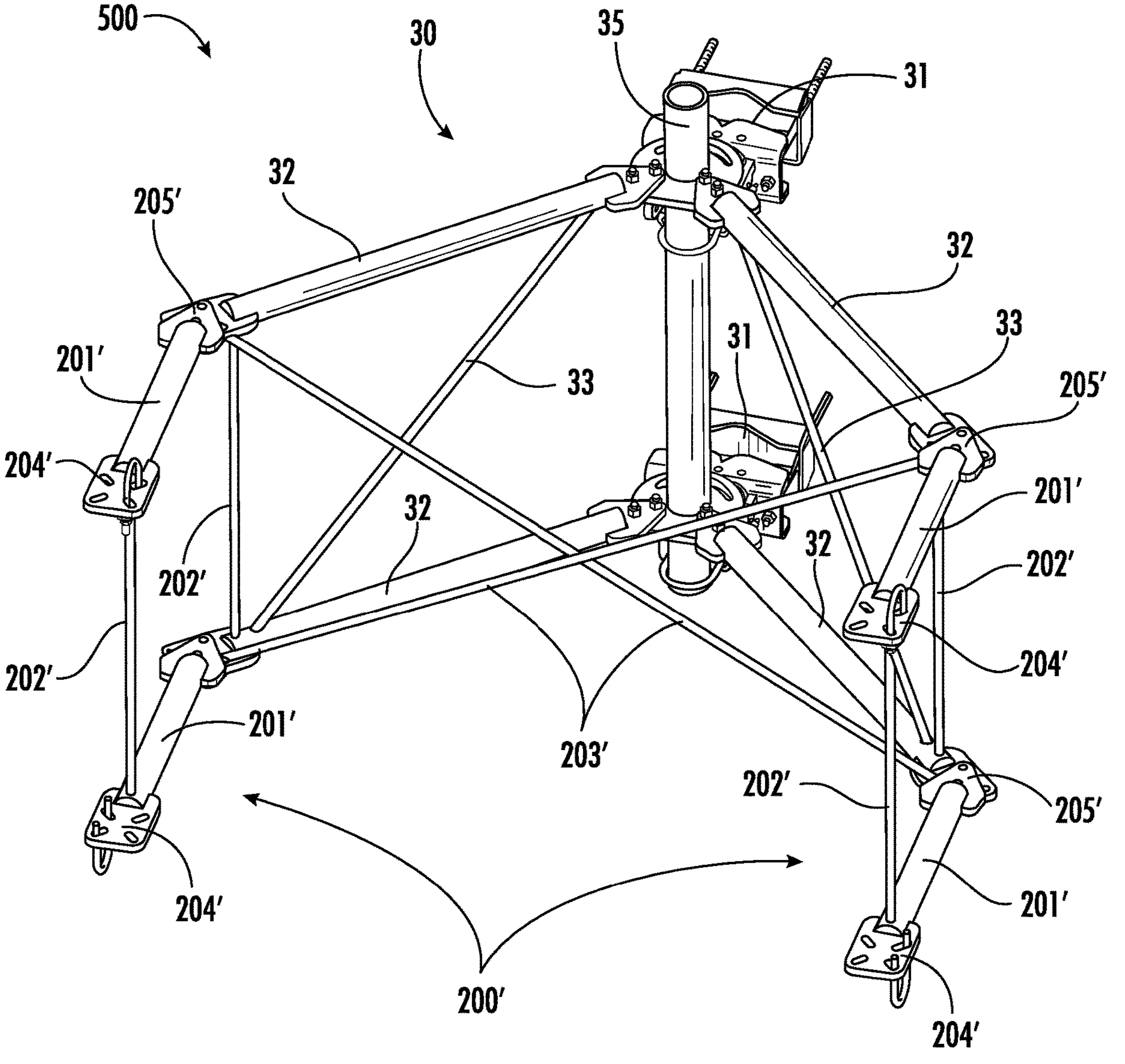
FIG. 7 is a perspective view of an alternative offset extension assembly according to embodiments of the present invention.

Referring now to FIG. 6 and FIG. 7, another sector frame antenna mount assembly 400 and offset extension assembly 500 according to embodiments of the present invention are illustrated. Properties and/or features of the sector frame antenna mount assembly 400 and offset extension assembly 500 (and offset extension units 200') may be as described above in reference to the assembly 100 and offset extension units 200 shown in FIGS. 3-5 and duplicate discussion thereof may be omitted herein for the purposes of discussing FIGS. 6-7. The sector frame antenna mount assembly 400 and offset extension assembly 500 differ from the assemblies 100, 200 described herein in the location of one or more of the support rods 203'.

As shown in FIG. 6, the assembly 400 is similar to the assembly 100 described above and includes a pair of offset extension units 200' which increase the distance ($D_E$) that the sector frame 20 is positioned from a mounting structure. The offset extension units 200' are configured to be securable to existing offset mounts 30, thereby allowing for the increased distance ($D_E$) without having to replace an entire existing antenna mount assembly, and thus, reducing costs. In addition, the increased distance ($D_E$) may allow for reduced PIM within the near antenna environment. Furthermore, the offset extension units 200' project the face of the sector frames 20 further from the mounting structure 50 to allow for an increased distance of separation ($D_S$) between adjacent ends of the sector frames 20 (and/or antennas 150 positioned at adjacent ends of the sector frames 20), for example, on smaller tower such as guyed towers.

As shown in FIG. 7, in some embodiments, the offset extension assembly 500 of the present invention may include cross-support rods 203' that extend between opposing extension units 200'. In some embodiments, each offset extension unit 200' may comprise two vertical support rods 202' with the two cross-support rods 203' extending between the offset extension units 200' to form a skeletal frame or scaffold. Similar to the support rods 202, 203 described herein, the plurality of support rods 202', 203' of the offset extension assembly 500 helps to provide structural support to the extension units 200' (and offset extension assembly 500) as well as the sector frame antenna mount assembly 400. Positioning the cross-supports 203' within the sector frame antenna mount assembly 400 between the extension units 200' may provide better support to the load weight of the sector frame 20 as well as help provide additional support the assembly 400 when subjected to a wind load.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A sector frame antenna mount assembly, the assembly comprising:
- an antenna mount, the antenna mount comprising:
  - first and second arms, each arm having upper and lower segments, the arms positioned at a non-zero angle relative to each other; and
  - a pipe clamp configured to secure the antenna mount to a mounting structure;
- a sector frame, the sector frame comprising a plurality of horizontal and vertical members, the vertical members configured such that one or more antennas can be mounted thereto; and
- a pair of offset extension units, each offset extension unit comprising:
  - two horizontal runs positioned parallel to each other, the horizontal runs being secured to each other via a plurality of support rods;
  - a first set of mounting plates secured to a first end of each horizontal run, wherein the first set of mounting plates are further secured to the upper and lower segments of a respective arm of the antenna mount; and
  - a second set of mounting plates secured to a second end of each horizontal run, wherein the second set of mounting plates are further secured to a respective horizontal or vertical member of the sector frame.

2. The assembly of claim 1, wherein the antenna mount is secured to the mounting structure via the pipe clamp.

3. The assembly of claim 2, wherein the mounting structure is a leg of an antenna tower.

4. The assembly of claim 1, wherein the pair of offset extension units, in combination with the antenna mount, position the sector frame a distance of 60 inches from the mounting structure.

5. The assembly of claim 1, wherein each offset extension unit has a length of about 18 inches.

6. The assembly of claim 1, wherein a pair of cross-support rods extend between the pair of offset extension units.

7. An offset extension mount kit, the kit comprising:
- an antenna mount, the antenna mount comprising:
  - first and second arms, each arm having upper and lower segments; and
  - a pipe clamp configured to secure the antenna mount to a mounting structure; and
- a pair of offset extension units, each offset extension unit comprising:
  - two horizontal runs positioned parallel to each other, the horizontal runs being secured to each other via a plurality of support rods;
  - a first set of mounting plates secured to a first end of each horizontal run and pivotably secured to the upper and lower segments of a respective arm of the antenna mount; and
  - a second set of mounting plates secured to a second end of each horizontal run, wherein the second set of mounting plates are configured to secure each horizontal run to a respective horizontal or vertical member of a sector frame antenna mount, wherein the pair of offset extension units are configured to position the sector frame antenna mount an increased distance from the mounting structure relative to the antenna mount.

8. The kit of claim 7, wherein the plurality of support rods includes two vertical support rods and two cross-support rods.

9. The kit of claim 7, wherein the first set of mounting plates have a rectangular shape and comprise a first plurality of mounting apertures.

10. The kit of claim 7, wherein the second set of mounting plates have a polygonal shape and comprise a second plurality of mounting apertures.

11. The kit of claim 7, wherein the horizontal runs are tubular in shape, and wherein each mounting plate of the first set of mounting plates and each mounting plate of the second set of mounting plates comprise a pair of slots configured to receive the end of a respective horizontal run.

12. The kit of claim 7, wherein each extension unit can be pivoted relative to a respective arm to a retracted position in which they are substantially parallel with each other.

13. A pair of offset extension units for a sector frame antenna mount assembly, each offset extension unit comprising:

two horizontal runs positioned parallel to each other, the horizontal runs being secured to each other via a plurality of support rods;

a first set of mounting plates secured to a first end of each horizontal run; and a second set of mounting plates secured to a second end of each horizontal run, wherein the first set of mounting plates are secured to an antenna mount and the second set of mounting plates are secured to a sector frame.

14. The assembly of claim 13, wherein the plurality of support rods includes two vertical support rods and two cross-support rods.

15. The assembly of claim 13, wherein the first set of mounting plates have a rectangular shape and comprise a first plurality of mounting apertures.

16. The assembly of claim 13, wherein the second set of mounting plates have a polygonal shape and comprise a second plurality of mounting apertures.

17. The assembly of claim 13, wherein the horizontal runs are tubular in shape, and wherein each mounting plate of the first set of mounting plates and each mounting plate of the second set of mounting plates comprise a pair of slots configured to the end of a respective horizontal run.

18. A sector frame antenna mount assembly, the assembly comprising:

a mounting structure;

three antenna mounts, each antenna mount comprising:

first and second arms, each arm having upper and lower segments, the arms positioned at a non-zero angle relative to each other; and a pipe clamp configured such that the antenna mount is secured to the mounting structure;

three sector frames, each sector frame comprising a plurality of horizontal and vertical members, the vertical members configured such that one or more antennas can be mounted thereto; and three pairs of offset extension units, each offset extension unit comprising:

two horizontal runs positioned parallel to each other, the horizontal runs being secured to each other via a plurality of support rods;

a first set of mounting plates secured to a first end of each horizontal run, wherein the first set of mounting plates are further secured to the upper and lower segments of a respective arm of the antenna mount; and a second set of mounting plates secured to a second end of each horizontal run, wherein the second set of mounting plates are further secured to a respective horizontal or vertical member of the sector frame, wherein each pair of offset extension units position a respective sector frame an increased distance from the mounting structure.

19. The assembly of claim 18, further comprising at least two antennas mounted to the sector frames, wherein a first antenna of the at least two antennas is positioned at an end of one of the sector frames and a second antenna of the at least two antennas is positioned at an adjacent end of an adjacent sector frame, and wherein each pair of offset extension units position the respective sector frames such that the first and second antennas are separated a distance in a range of from about 2 feet to about 6 feet.

* * * * *